United States Patent [19]

Morokawa

[11] 4,205,518
[45] * Jun. 3, 1980

[54] VOLTAGE CONVERSION SYSTEM FOR ELECTRONIC TIMEPIECE

[75] Inventor: Shigeru Morokawa, Tokyo, Japan

[73] Assignee: Citizen Watch Company Limited, Tokyo, Japan

[*] Notice: The portion of the term of this patent subsequent to Jun. 13, 1995, has been disclaimed.

[21] Appl. No.: 912,268

[22] Filed: Jun. 5, 1978

Related U.S. Application Data

[62] Division of Ser. No. 726,013, Sep. 22, 1976, Pat. No. 4,094,137.

[30] Foreign Application Priority Data

Sep. 27, 1975 [JP] Japan ............................ 50-116620

[51] Int. Cl.² .............................................. G04C 3/00
[52] U.S. Cl. ...................................... 368/67; 368/79; 368/83
[58] Field of Search ............... 58/23 R, 23 A, 23 AC, 58/23 BA, 50 R, 57, 58

[56] References Cited

U.S. PATENT DOCUMENTS

| | | | |
|---|---|---|---|
| 3,999,368 | 12/1976 | Yoshida | 58/23 BA |
| 3,999,370 | 12/1976 | Morokawa | 58/23 R |
| 4,094,137 | 6/1978 | Morokawa | 58/23 BA |

*Primary Examiner*—J. V. Truhe
*Assistant Examiner*—Leonard W. Pojunas, Jr.
*Attorney, Agent, or Firm*—Frank J. Jordan

[57] ABSTRACT

A voltage conversion system for an electronic timepiece having a power source, which system generates power at lower voltage level than that of the power source for operating at least one of a frequency standard, a frequency converter, a time counter circuit and a display system. The voltage conversion system comprises an oscillator circuit coupled to the power source to generate output signals, a plurality of capacitors, and a plurality of switching elements responsive to the output signals for alternately setting the capacitors in a parallel connected condition and a series connected condition, whereby an output voltage lower than that of the power source is generated at an output terminal of the system.

16 Claims, 23 Drawing Figures

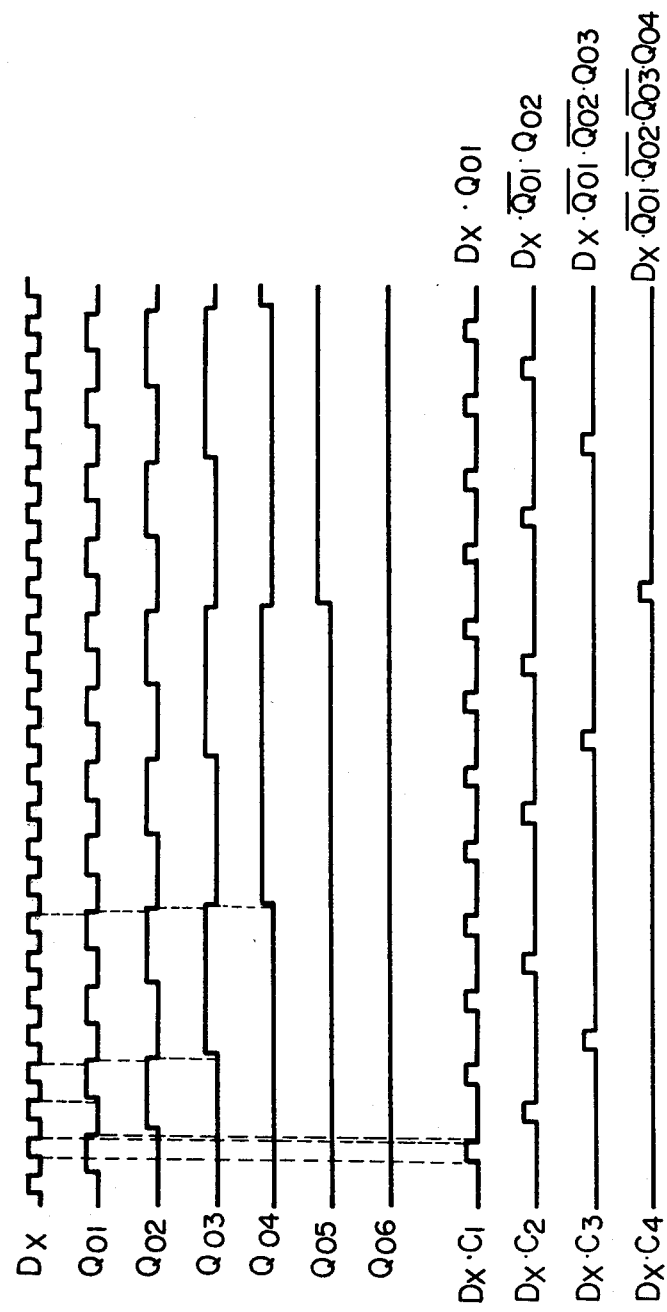

VOLTAGE CONVERSION SYSTEM FOR ELECTRONIC TIMEPIECE

This is a division of Ser. No. 726,013, filed Sept. 22, 1976, now U.S. Pat. No. 4,094,137.

This invention relates, in general, to electronic timepiece systems, and, more particularly, to electronic timepiece systems with low power consumption.

Until now, there has been an increasing trend towards miniaturization in electronic timepieces, whose size is primarily determined by such elements as a crystal oscillator, pulse motor, display elements, and battery. Together with this trend, it is also true that the market appeal of such a timepiece is appreciably affected by its operating lifetime, before replacement or recharging of the battery must take place. This is primarily determined by the power required to drive such elements as a frequency divider, pulse motor and crystal oscillator, together with the leakage current of the battery itself. In the case of a mechanically driven display, the improvements which have taken place in the design of gearwheel mechanisms in recent years, together with more efficient designs of motors, have reduced the level of power required for display driving to as low as 1 μw, as compared with the level of 10 μw required several years previously. In the case of an electronic timepiece utilizing a liquid crystal type display, the power required to drive the display is less than 0.5 μw. Thus, if the power required for display driving were the only factor in battery power consumption, it would be possible to use batteries of one tenth the capacity of those used previously or to have an operating lifetime of as long as ten years before battery replacement. However, at the present time, the power consumption in an electronic timepiece other than the power used in display driving is of the order 3 μw to 1.5 μw. Of this consumption, two thirds is required by the crystal oscillator circuit and one third for frequency divider circuits and other circuits. Thus, it can be reasonably stated that the main obstacle to the recent trend towards timepieces of thinner shape and longer battery lifetime can be attributed to the various electronic circuits incorporated within the timepiece.

According to the present invention, power supply systems may be incorporated within the timepiece circuitry so that power may be supplied to such circuits as the crystal oscillator and frequency dividers at a lower voltage than that of the battery. Thus, the power dissipated within such circuits is reduced by the reciprocal of the square of the voltage reduction. If the voltage supplied is reduced to one half of the battery voltage, then the power consumption is proportional to a value of $V^{-2}$, i.e. one fourth of consumption when the full battery voltage is applied, or one twenty-fifth if the voltage applied is reduced to one fifth of the battery voltage. Thus, by the system of the present invention, it becomes possible to design electronic timepieces which are thinner in size and have longer battery lifetime than conventional timepieces, due to having substantially reduced power consumption.

To achieve the maximum degree of timekeeping accuracy in an electronic timepiece, it is necessary that the crystal oscillator which functions as a timekeeping frequency standard has negligible drift in frequency when subjected to changes in temperature, or that such changes are cancelled by some means of compensation. With the present invention, it is also possible to incorporate such compensation means within the voltage conversion circuitry, such that, in the case of a wristwatch, temperature changes of the case of the watch caused by contact with the wearer's body or by ambient air temperature fluctuations have virtually no effect upon timekeeping accuracy.

The present invention is highly suitable for application to a multifunction timepiece such as a multi-alarm type wristwatch, a calendar timepiece, etc. It is also suited to any application for which it is desirable to use two or more different voltages for different but related functions. For example, display of the results of a calculation can usually be performed utilizing signals of relatively low frequency, which can be generated efficiently using a low voltage power source. To perform the calculation itself at high speed, however, a source of relatively higher voltage will normally be required because of the higher frequencies involved. Thus, by enabling a high voltage supply to be switched to the circuitry section involved in calculation only when such calculations are actually performed, it is possible using the present invention to combine the advantages of high operational effectiveness with low power consumption.

It is therefore an object of the present invention to provide an improved electronic timepiece of low power consumption, achieved by level conversion of the voltage of the timepiece power source at a high level of efficiency.

It is another object of the present invention to provide an improved electronic timepiece in which compensation is provided for changes in the frequency of the crystal oscillator element used as a frequency standard for timekeeping, due to temperature variations.

It is another object of the present invention to provide an improved electronic timepiece in which the threshold voltages of semiconductor active circuit elements are used as a reference voltage in a power supply circuit such that variations in the threshold voltages of circuits due to processing variations in IC manufacturing process are compensated and current consumption is reduced to a small and desirable value.

It is still another object of the present invention to provide an improved electronic timepiece of thinner shape and longer battery operational lifetime than electronic timepieces of conventional design, which timepiece is simple in construction and low in manufacturing cost.

In the accompanying drawings, in which:

FIGS. 6C and 6D are waveform diagrams for the circuit of FIG. 6B;

Figure 1:
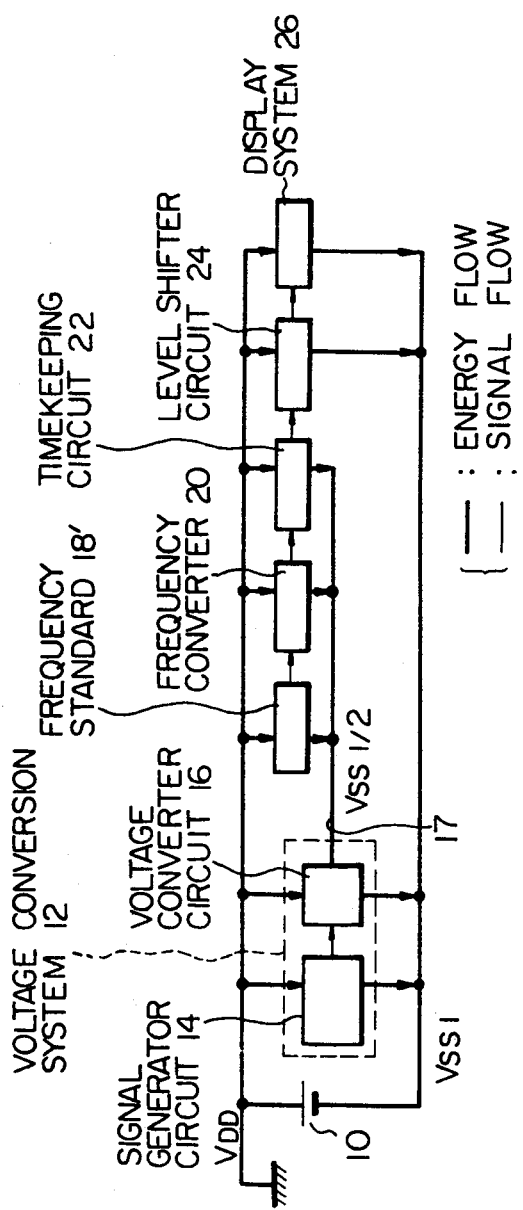
FIG. 1 is a block diagram of an electronic timepiece incorporating a voltage conversion system according to the present invention.

Referring now to FIG. 1 in which the thick lines indicate paths of energy flow while the thine lines indicate paths of signal flow, there is shown a block diagram of an electronic timepiece incorporating a voltage conversion system according to the present invention. As shown, the electronic timepiece generally comprises a power source 10, a voltage conversion system 12 including a signal generator circuit 14 and a voltage converter circuit 16, a frequency standard 18, a frequency converter 20, a timekeeping counter 22, a level shifter circuit 24 and a display system 26. The power source 10 may comprise a silver oxide battery or a combination of a solar cell and rechargeable battery, for example.

The signal generator circuit 14 comprises an auxiliary oscillator circuit adapted to provide an output signal, and a waveform shaping circuit coupled to the output of the oscillator circuit to provide output signals complementary to each other. The auxiliary oscillator circuit may comprise CMOS inverter stages connected as a ring oscillator. The waveform shaping circuit may comprise an inverter stage as will be described in detail hereinafter. The voltage converter circuit 16 contains a number of switching elements which are synchronously driven by output signals from the waveform shaping circuit, to provide a reduced voltage of, for example, one half of the output voltage of the power source 10 appearing on lead 17 as $V_{ss\frac{1}{2}}$. This voltage is supplied to the frequency standard 18, frequency converter 20 and timekeeping or time counter circuit 22, which are operated at a low voltage level.

The frequency standard 18 may comprise a crystal controlled oscillator circuit which oscillates at a frequency of, for example, 32,768 Hz. This relatively high frequency is supplied to the frequency converter 20 in the form of a divider which devide down the frequency from the standard 18 so that the output from the converter 20 is low frequency of, for example, 1 Hz. This signal is applied to the time counter circuit 22 which produces various output signals including time or calendar information. These output signals of small voltage amplitude are applied to the level shifter circuit 24, which is operated at a high voltage such as a supply voltage level of the power source 10. The level shifter circuit 24 functions to change the voltage level or amplitude of the various output signals from the time counter circuit 22 without changing the information carried thereby. It should be noted that the number of signal paths and the signal frequency applied to the level shifter circuit will vary in accordance with where level shifter circuit 24 is positioned. If it is placed previous to the timekeeping circuits, the power consumption is increased due to the higher frequency. On the other hand, if it is placed after the timekeeping circuits, power consumption is reduced but the number of the level shifter circuits is increased.

Time or other information held in the timekeeping counter 22 is displayed by the display system 26, which incorporates a display drive circuit and a display device.

Figure 2:
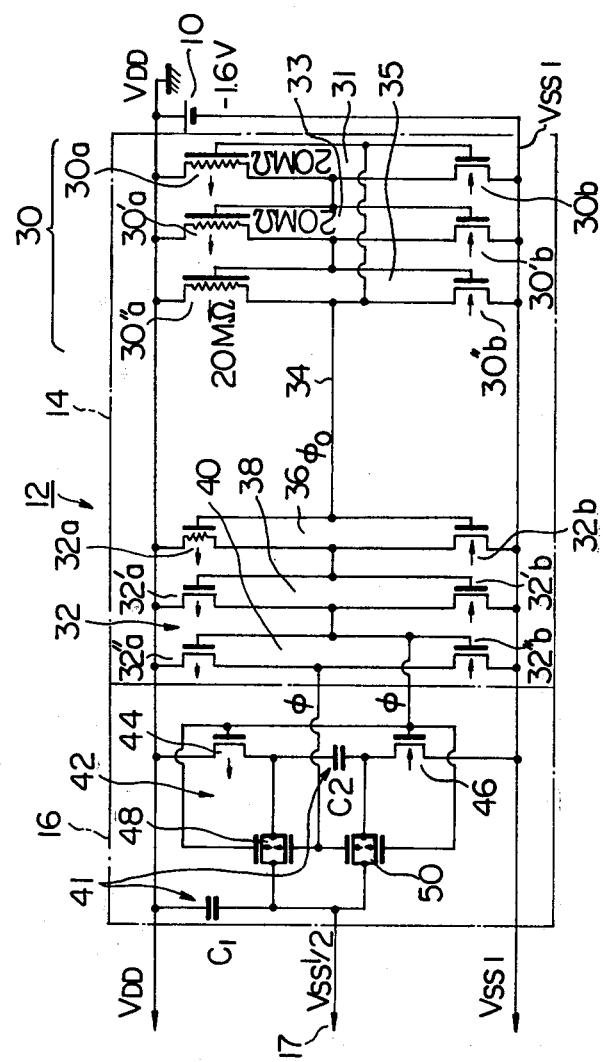
FIG. 2 is a detail circuit diagram of a preferred embodiment of the voltage conversion system shown in FIG. 1 to provide an output voltage which is one half of a battery voltage.

FIG. 2 shows a preferred embodiment of the voltage conversion system shown in FIG. 1. As shown, the signal generator circuit 14 comprises an oscillator circuit 30 coupled to the battery 10 and operated at a supply voltage of 1.6 V, and a waveform shaping circuit 32 coupled to an output of the oscillator circuit 30. The oscillator circuit 30 comprises a plurality of stages of inverter circuits 31, 33 and 35 arranged in a ring configuration, each of which comprises a complementary pair of a P-channel metal oxide semiconductor field effect transistor (hereinafter referred to as a P-channel MOSFET) 30a and an N-channel metal oxide semiconductor field effect transistor (hereinafter referred to as an N-channel MOSFET) 30b connected between the positive supply line $V_{DD}$ and the negative supply line $V_{ss1}$ of the battery 10. The gate electrodes of the P-channel MOSFET 30a and the N-channel MOSFET 30b are coupled together and connected to the output of the inverter circuit 35, i.e., the connected node of the drain electrode of the P-channel MOSFET 30"a and the drain electrode of the N-channel MOSFET 30"b. Likewise, the gate electrodes of the P-channel MOSFET 30'a and the N-channel MOSFET 30'b are coupled together and connected to the output of the inverter circuit 31, i.e., the connected node of the drain electrode of the P-channel MOSFET 30a and the drain electrode of the N-channel MOSFET 30b. The gate electrodes of the P-channel MOSFET 30"a and the N-channel MOSFET 30"b are coupled together and connected to the output of the inverter circuit 33, i.e., the connected node of the drain electrode of the P-channel MOSFET 30'a and the drain electrode of the N-channel MOSFET 30'b. As previously noted, the source electrodes of the P-channel MOSFETs 30a, 30'a and 30"a are coupled in parallel to the positive supply line $V_{DD}$ of the battery 10, while the source electrodes of the N-channel MOSFETs 30b, 30'b and 30"b are coupled in parallel to the negative supply line $V_{ss1}$ of the battery 10. The oscillator circuit 30 thus arranged will oscillate at a frequency between 100 and 1000 Hz to provide an output signal $\phi_o$ on lead 34. The current drain of the oscillator circuit 30 is between 0.1 μA and 0.01 μA. Low GM (mutual conductance) FETs are preferably used, for example, the P-channel FETs 30a, in order to reduce the current which flows in each inverter stage during instants when both are turned on simultaneously, i.e. during voltage level transitions. The current drawn by the oscillator circuit may also be reduced by connecting it to the power source via a high value of resistance. The output signal $\phi_o$ on lead 34 is applied to the waveform shaping circuit 32.

The waveform shaping circuit 32 comprises a plurality of stages of inverter circuits 36, 38 and 40, each of which comprises a complementary pair of a P-channel MOSFET 32a and an N-channel MOSFET 32b. Waveform shaping of the output signal $\phi_o$ from the oscillator circuit 30 is performed by the inverter circuit 36, whose output is applied to two series-connected inverter circuits 38 and 40. The outputs from the inverter circuits 38 and 40 are indicated as $\phi$ and $\bar{\phi}$, respectively, these signals being complementary to each other. Signals $\phi$ and $\bar{\phi}$ are applied to the voltage converter circuit 16. It should be noted that it is not necessary to the present invention that signals $\phi$ and $\bar{\phi}$ be precisely complementary. It is possible, for example, to apply an multi-phase signal to the voltage converter circuit, together with its inverse, by applying the outputs of adjacent inverters in the auxiliary oscillator circuit to a decoder circuit such as an exclusive OR circuit. That is because of the fact that the output signals from odd-numbered inverters in the auxiliary oscillator circuit are of the same level but different in phase. For the voltage converter circuit of the embodiment shown in FIG. 2, however, a single phase pair of complementary signals are utilized by way of example.

The voltage converter circuit 16 comprises a plurality of electric energy storage means 41, and a switching means 42 for alternately setting the plurality of electric energy storage means into a parallel connection condition and a series connection condition between the positive supply line $V_{DD}$ and the negative supply line $V_{ss1}$ in response to the output signals from the signal generator 14. In FIG. 2, the electric energy storage means 41 is shown as comprising a first capacitor $C_1$ and a second capacitor $C_2$. The switching means 42 is composed of a plurality of switching elements, i.e., a complementary pair of a P-channel MOSFET 44 and an N-channel MOSFET 46, and first and second transmission gates 48 and 50, each composed of a P-channel MOSFET and an N-channel MOSFET. The gate electrodes of the P-channel MOSFET 44 and the N-channel MOSFET 46 are coupled together and connected to the output of the inverter circuit 38 of the waveform shaping circuit 32, to which control terminals of the transmission gates 48 and 50 are also connected. The source electrodes of the P-channel MOSFET 44 and the N-channel MOSFET 46 are coupled to the positive supply line $V_{DD}$ and the negative supply line $V_{ss1}$, respectively. The drain electrodes of the P-channel MOSFET 44 and the N-channel MOSFET 46 are coupled together via the second capacitor $C_2$. The first transmission gate 48 has an electrode coupled to the first capacitor $C_1$ and the other electrode coupled to the drain electrode of the P-channel MOSFET 44 and the second capacitor $C_2$. Similarly, the second transmission gate 50 has an electrode coupled to the first capacitor $C_1$ and the other electrode coupled to the second capacitor $C_2$ and the drain electrode of the N-channel MOSFET 46. The control terminals of the transmission gates 48 and 50 are coupled to the output of the inverter circuit 40 of the waveform shaping circuit 32.

With the arrangement mentioned above, when the output signal $\phi$ goes to a high logic level, the switching elements 46 and 48 are turned on whereas the switching elements 44 and 50 are turned off. Thus, the capacitors $C_1$ and $C_2$ become connected in series with each other across the power source 10. In this state capacitor $C_1$ and $C_2$ each will become charged and the sum of the charged voltage is equal to that of the power source 10. When, now, the output signal goes to a low logic level, the switching elements 44 and 50 are turned on whereas the switching elements 46 and 48 are turned off. In this condition, the capacitors $C_1$ and $C_2$ have thereby become connected in parallel with each other to make the charged voltage equal to each other. Thus, this voltage i.e. $V_{ss\frac{1}{2}}$ appears at the output 17.

It is possible to use capacitors $C_1$ and $C_2$ which are not identical in value. However, since in this case the voltage to which each becomes charged when they are connected in the series state will not be identical, Joule losses due to charge transfer for voltage equalization will occur when they are switched into the parallel connection state. This will result in a loss in efficiency. By cyclically switching signals $\phi$ and $\bar{\phi}$ at a sifficiently high frequency, a constant output voltage of one half the battery voltage is thus obtained at output terminal 17. It is convenient that the output voltage conversion ratio of this circuit is decided by only the circuit connection independenly of the value in capacitances.

It should be noted that for MOSFETs 44,46 and gates 48 and 50, the impedance in the OFF state must be extremely high and the leakage current from source to drain must be very small, in order to prevent losses due to the potential applied between its source and drain in the OFF state.

It is also possible to utilize a system which does not incorporate the type of auxiliary oscillator shown in FIG. 2. Instead, switching signals for the voltage converter circuit 16 may be supplied from the crystal oscillator circuit which functions as the time standard signal source, or from a frequency divider stage connected to the crystal oscillator output. In this case, the battery voltage would be applied directly to the crystal oscillator circuit. It is also possible to utilize an auxiliary oscillator of other configuration than that shown in the example of FIG. 2. The low voltage obtained by level conversion in this case may be used in matrix driving of a liquid crystal display, or for supplying low level bias voltages to various parts of the circuitry.

It should be noted that if a waveform shaping circuit as shown in FIG. 2 is not incorporated, following the auxiliary oscillator circuit, then the drain of inverter stages 38 and 40 will be increased. This is due to the fact that the relatively slow risetimes of the waveform of output $\phi_o$ of the auxiliary oscillator cause a short circuit current to flow from the battery through the inverters 38 or 40 each time a level transition of signal $\phi_o$ occurs. Use of waveform shaping circuit 32 ensures that transitions occur sufficiently rapidly that the current drawn by inverters 38 and 40 is extremely low.

Figure 3A:
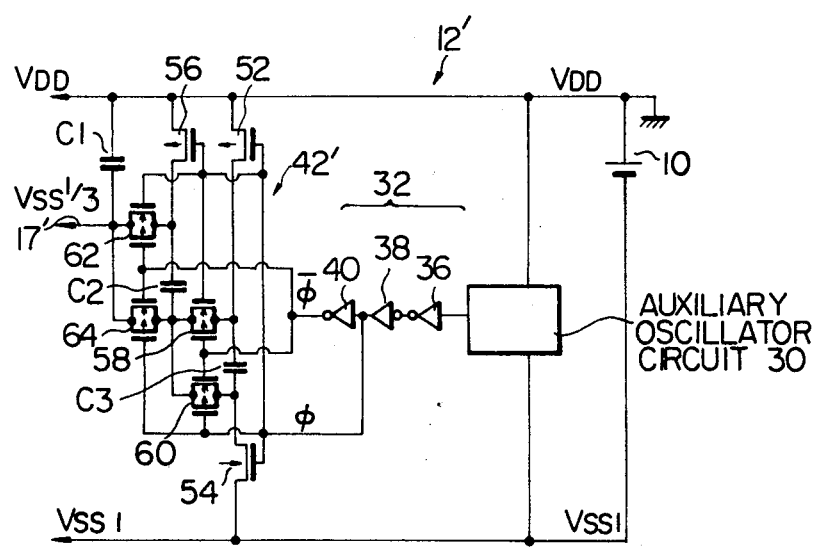
FIG. 3A is a partially detailed circuit diagram of another preferred embodiment of the voltage conversion system adapted to provide an output voltage of one third of the battery voltage.

FIG. 3A shows another preferred embodiment of the present invention adapted to provide a voltage of one third of the timepiece battery voltage. In FIG. 3A, a battery 10 supplies power to an auxiliary oscillator circuit 30, whose output is applied to a waveform shaping circuit 32 including inverters 36, 38 and 40. When output signal $\phi$ from inverter 38 goes to the high logic level, then N-channel MOSFET 54 together with transmission gates 62 and 58 are turned on. Three capacitors C1, C2 and C3 are thereby effectively connected in series with each other and with the power source 10 and are charged therefrom. When the output signal $\phi$ subsequently goes to the low logic level, then the MOSFET 54 and transmission gates (referred to hereinafter as TGs) 62 and 58 go to the OFF state, while P-channel MOSFETs 52 and 56 and TGs 64 and 60 go to the ON state. Capacitors C1, C2 and C3 are thereby connected in parallel. If these capacitors are each of equal value, then they will each have been charged to one third of the voltage of power source 10. Thus when they are now connected in the parallel condition, a voltage of one third of the battery voltage appears at output terminal 17'. Even if the three capacitors C1, C2 and C3 are of unequal values, one third of the voltage which is the average of the voltage to which each capacitor has been charged will appear at output terminal 17'. However, as stated previously, for optimum efficiency of operation, capacitors of identical value are preferable.

Figure 3B:
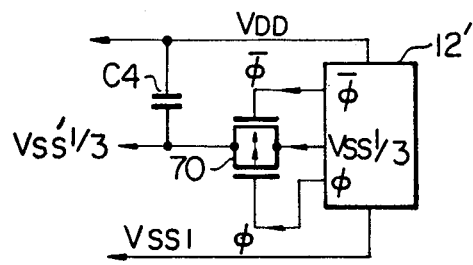
FIG. 3B is a diagram showing a modification of the circuit of FIG. 3A, whereby the output impedance presented to the load is reduced.

It should be noted that the larger the value of capacitors C1, C2 and C3, the lower will be the output impedance appearing at terminal 17'. On the other hand, from the point of view of minimizing component costs, these capacitors should be as small as possible. In FIG. 3B, a system is shown whereby these conflicting requirements for capacitor size may be reconciled. Within the voltage conversion system 12', capacitors of low value are used. A transmission gate 70 switches the output from voltage conversion system 12' into a comparatively large value buffer capacitor C4. It should be noted that switching element 70 connects the output of the voltage conversion system 12' to capacitor C4 only while the three capacitors within the voltage conversion system 12' (corresponding to C1, C2 and C3 in FIG. 3A) are effectively connected in parallel. Thus, any Joule losses due to charge being transferred to capacitor C4 while the capacitors within the voltage conversion system 12' are being charged from the voltage source, are prevented. With the arrangement shown in FIG. 3B, the output impedance presented to the load is reduced.

Figure 4A:
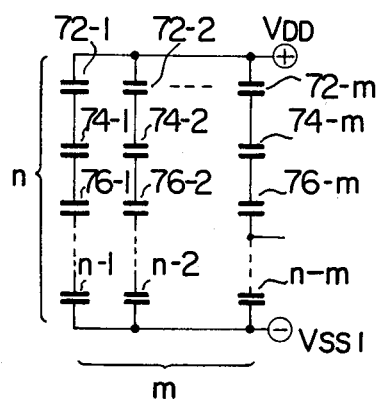
FIGS. 4A and 4B are simplified diagrams showing the basic functioning of the voltage conversion system.
Figure 4B:
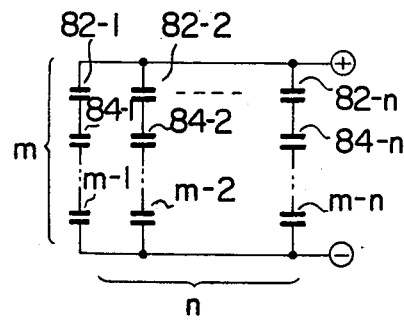

FIGS. 4A and 4B illustrate the way in which a voltage equal to n/m times a source voltage may be obtained. Assume that each of the capacitors 72-1 to n-m has the capacity value $C_0$, and that the source voltage is $V_0$ (i.e. the potential difference between $V_{DD}$ and $V_{SS1}$), and also that the capacitors have not been charged previously. When connection is now made as shown in FIG. 4A, a charge Q equal to $C_0V_0/n$ is stored in each capacitor, and a voltage of $V_0/n$ appears across the terminals of each.

In FIG. 4A, m columns of capacitors, containing capacitors equally charged as stated above, are connected in parallel. If now, these capacitor connections are rearranged as shown in FIG. 4B, maintaining the same capacitor charge conditions as in FIG. 4A, then a voltage of $m/nV_0$ will appear across the set of n columns of m capacitors.

It should be understood that this example is only provided to enable a clear understanding of the principles of operation of the present invention. In practice, a lower number of capacitors will normally be sufficient. Two ways in which the number of capacitors may be reduced will now be described.

(1) If $n/m > \frac{1}{2}$, then it follows that $(1-n/m) < \frac{1}{2}$. Thus, it is possible to utilize the difference between the output voltage of a voltage conversion system and the power source voltage to provide a voltage $V_0(1-n/m)$. If the capacitors were arranged as described in the previous paragraph, then to obtain this voltage, nm capacitors of equal value would be required. Thus, it is possible to save a total of (m/2−n) capacitors if n is made greater than m.

(2) Where m columns of n series connected capacitors are reconnected to provide n columns of m series connected capacitors, each of the latter columns of series connected capacitors may be replaced by a single capacitor of low value. Thus, if there were n columns of n series connected capacitors, i.e. a total of $n^2$ capacitors, these can be replaced by n capacitors each having the value 1/n.

A mode in which the voltage conversion is performed in the circuit shown in FIGS. 2, 3 and 4 will now be summarized.

Firstly, capacitors are connected in series with each other and with the power source and are charged therefrom. A plurality of columns of series connected capacitors may be connected in parallel with the power source or one of the capacitors may be connected in parallel with the other one of the capacitors. The series connected capacitors or the columns of series connected capacitors charged in the above mode are then connected in parallel with one another, and the charged voltages will be equalized. It is required in a no-load steady state that the charged voltages in the capacitors be equal to each other just before the series connected capacitors are rearranged in a parallel connected condition. If this requirement is not met, the efficiency is reduced. The equalizing connections may be sequentially performed in plural states or alternately in various modes combined with the first mode.

As previously noted, it is possible to provide a voltage of $n/m V_0$ with the use of m capacitors provided each of n and m is integer and $n < m$. In this case, m capacitors are first connected in series with the power source and charged therefrom. One of m capacitors is then sequentially connected in parallel with each of the remaining capacitors (m−1) to equalize the voltage across the terminals of each, providing a voltage $V_0/m$. The (m−1) capacitors remain connected in series, and an output voltage will be obtained at terminals of n capacitors connected in series. The output terminal of the n capacitors may be coupled to a circuit shown in FIG. 3B.

Figure 5:
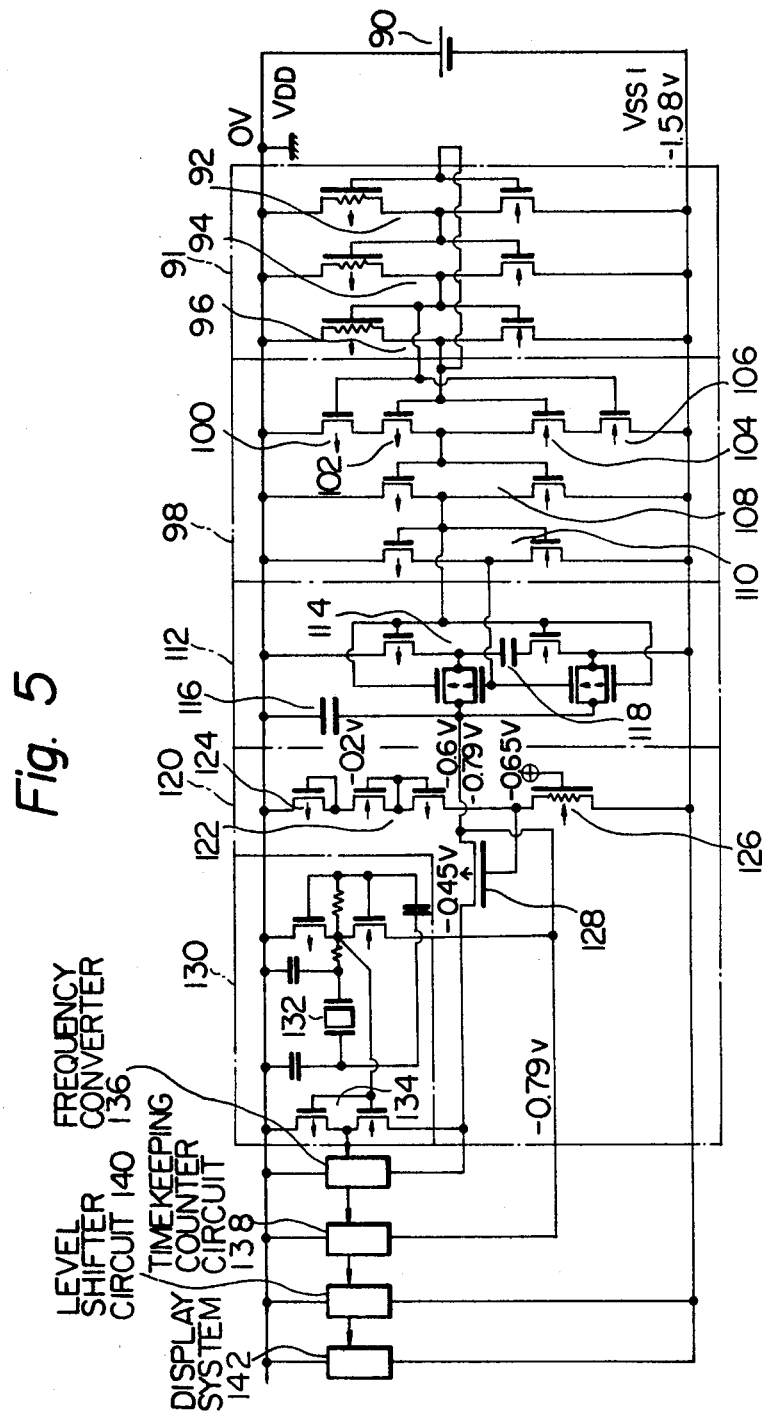
FIG. 5 is a partially detailed circuit diagram of an example of a timepiece circuit in which voltage conversion circuit together with a voltage stabilizer circuit are incorporated.

In FIG. 5, the voltage conversion system of the present invention is shown as combined with a voltage stabilizer circuit whose operation is based upon the threshold voltages developed by semiconductor active circuit elements. The embodiment shown in FIG. 5 is effective for timepiece utilizing such power sources as lithium batteries, which have high power and long life. However the voltage developed by a lithium type of battery is rather high for use with an electronic timepiece, approximately 3.2 V.

In FIG. 5, a battery 90 is connected to an auxiliary oscillator circuit 91 including inverters 92, 94 and 96, these inverters being connected as a ring oscillator with extremely low current drain. The output of each inverter is delayed by $2\pi/3$ in phase with respect to the other stages. Waveform shaping of the output from this auxiliary oscillator formed by inverters 92, 94 and 96 is performed by a waveform shaping circuit 98 composed of MOSFETs 100, 102, and 104 and 106. The output from the waveform shaping circuit is sent through inverter stages 108 and 110 to a voltage conversion circuit 112 including a switching circuit 114 and capacitors 116 and 118. Down conversion to a level of one half of the battery voltage is thereby accomplished as described above for other embodiments of this invention. The output from the voltage converter circuit 112 is applied to a voltage stabilizer circuit 120. A voltage control reference, with characteristics similar to those of a Zener diode is formed by an inverter gate with dc negative feed-back loop connection indicated by numeral 122. The voltage developed across the inverter 122 is equal to the sum of the absolute values of the threshold voltages of the P-channel and N-channel MOSFETs and can be stated as ($|VTP|+VTN$). The inverter 122 is connected in series with a P-channel MOSFET 124 connected as a source follower, so that the total voltage developed across the combination is ($2|VTP|+VTN$). N-channel MOSFET 126 functions as a high value resistor, whereby a small current is drawn through the inverter 122 and MOSFET 124. P-channel MOSFET 128 has a large current carrying capacity, and functions as a source follower circuit, so that the output voltage at the source of MOSFET 128 differs from the voltage at its gate by the amount $|VTP|$, i.e. the threshold voltage of the MOSFET 128. Since the voltage applied to the gate of MOSFET 128 is the sum of the voltages across the inverter 122 and MOSFET 124, the voltage dropped across MOSFET 124 compensated for the gate-to-source voltage drop in MOSFET 128. Thus, the output voltage at the source of MOSFET 128 is equal to the voltage across the inverter 122, i.e. ($|VTP|+VTN$). Since any change in the magnitude of this voltage due to variations in the manufacturing process of the CMOS integrated circuit of the timepiece is equal to the change in value of the threshold voltage of CMOS transistors supplied from the source terminal of MOSFET 128, this circuit ensures precise regulation of the supply voltage, irrespective of process variations. The output of the voltage stabilizer circuit 120 is applied to a frequency standard 130 such that the current consumption will be reduced to a small and desired value and an output frequency is not affected by variations in the supply voltage from the battery.

The frequency standard 130 is controlled by a quartz crystal 132 to generate an output signal at a relatively high frequency. The output signal from the frequency standard 130, is applied through a waveform shaping circuit 134 to a frequency converter 136 in the form of a divider which divides down the frequency from the standard 130 to a lower frequency signal. Time counter circuit 138 receives a relatively low frequency signal from the frequency converter 136, and is operated at the same relatively low supply voltage as frequency standard 130 with little loss in power efficiency. Frequency converter 136, which presents a high mean impedance to its power source, is also operated from a lower voltage supply, for maximum efficiency. Level shifter circuit 140 and display system 142 function as previously described.

Figure 6A:
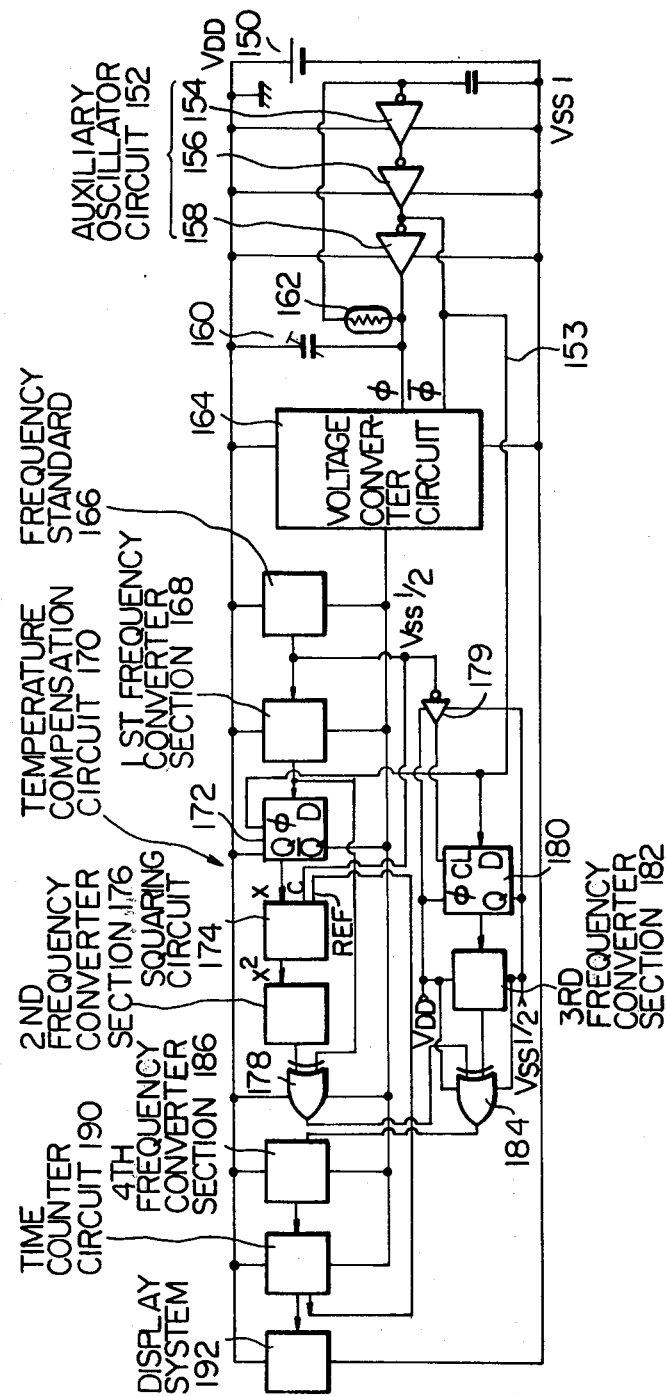
FIG. 6A is a block diagram showing another example of a timepiece circuit in which the voltage conversion system of the present invention is incorporated together with a means of compensating any frequency drift of the crystal oscillator due to temperature changes.

FIG. 6A shows another example of an electronic timepiece incorporating a temperature compensation circuit associated with a voltage conversion system according to the present invention. The electronic timepiece comprises a power source 150 to which an auxiliary oscillator circuit 152 is coupled.

The auxiliary oscillator circuit 152 functions not only as a temperature sensitive oscillator but also a signal generator for the voltage converter, and includes three inverters 154, 156 and 158, of low mutual conductance. The frequency of the oscillator 152 is controlled by a trimming capacitor 160 and a resistor 162. Either capacitor 160 or resistor 162 has a linear type of variation in value with respect to temperature, such that the frequency of oscillator 152 varies in linear fasion with changes in temperature. Alternatively, these elements 160 and 162 may be dispensed with and, in place thereof, the ring oscillator circuit may be arranged such that it generates an output frequency varying in phase in proportion to the variations in ambient temperature. In this case, the ring oscillator may be preferably combined with the stabilizer 120 shown in FIG. 5. Either of both capacitor 160 and resistor 162 may be connected externally to the integrated circuit chip of the oscillator 152, so that, for example, resistor 162 may comprise a thermistor or capacitor may comprise a temperature sensitive capacitor. In this case, adjustment of the frequency of the oscillator 152 may be accomplished by varying such an external component. Alternatively, the resistor 162 may be incorporated within the integrated circuit chip of the oscillator circuit, while the capacitor 160 may be composed of stray capacitance. Such a method will be possible provided that sufficient consistency of reproducibility can be maintained in integrated circuit manufacture.

If a silver oxide type of battery is used for power source 150, and the temperature coefficient of oscillator 152 is large, then the battery voltage may be applied directly to inverters 154, 156 and 158. However, if a manganese type of battery is used (in the case of a timepiece for use in the home, for example), or if temperature sensing is performed by on-chip components as mentioned above, so that the temperature coefficient of oscillator 152 is not large, then it is desirable to supply oscillator circuit 152 from a simple voltage regulator circuit. A suitable type of regulator circuit is that described hereinabove with reference to 120 in FIG. 5, since this regulator provides not only compensation for changes in transistor characteristics caused by variations in manufacturing processing but also compensation for battery supply voltage.

Block 164 in FIG. 6A represents a voltage converter circuit as described hereinabove, being switching by output signals $\phi$ and $\bar{\phi}$ from the auxiliary oscillator 152. A crystal controlled frequency standard 166 is coupled to the output of the voltage converter circuit 164 and operated at a low supply voltage of $V_{ss\frac{1}{2}}$. The output signal from the frequency standard 166 is applied to a first frequency converter section 168 which is also operated at the supply voltage level of $V_{ss\frac{1}{2}}$.

In the case of an X-cut crystal being utilized in the frequency standard 166, the frequency f of a signal whose component frequencies when summed together provide a temperature compensated frequency may be expressed:

$$f = f_O(1 + (\theta - \theta_o)^2 a) \quad (1)$$

where $f_O$ is the frequency at a designated referency temperature, $\theta$ is temperature and $a$ and $\theta_o$ are constants, such that $a \approx 10^{-4}$, $\theta_o = 25$ (°C.).

A relatively low frequency low frequency signal from the 1st frequency converter section 168 is applied to a temperature compensation circuit 170 to which an output signal $\bar{\phi}$ is applied from the auxiliary oscillator circuit 152 vid lead 153. The temperature compensation circuit 170 generally comprises a data type flip-flop 172, a frequency squaring circuit 174, a second frequency converter section 176, a first frequency summing gate 178, an inverter 179, a data type flip-flop 180 serving as a synchronizing circuit, a third frequency converter section 182, and a second frequency summing gate 184.

In FIG. 6A, the first frequency component (i.e. "1" within the brackets in the above equation) corresponds to the path in which the output of the frequency standard 166 is applied to one input of the frequency summing gate 178 and hence through another frequency summing gate 184 to final frequency converter section 186 and time counter circuit 190. The second term within the brackets of the above frequency equation corresponds to the circuit path through the data type flip-flop 180 and the frequency converter section 182 into the frequency summing gate 184. The term corresponding to the square of the temperature component in equation (1) above is represented by the path through the data type flip-flop 172, frequency squaring circuit 174 and the second frequency converter section 176.

The data type flip-flop 172 serves as a frequency sampling circuit to produce a sample output signal whose frequency is proportional to the number of cycles per second by which the frequency of the auxiliary oscillator circuit 152 has varied from a preset referency frequency (such a frequency might be $f_o/32$ that generated at a specific preset temperature which will be referred to as "zero temperature co-efficient" temperature, i.e., 25° C., for example). With oscillator 152 output $\bar{\phi}$ applied to the clock input of the data type flip-flop 172 and the output of frequency converter section 168 applied to the data input of flip-flop 172, then if the frequency of the output signal $\bar{\phi}$ is an exact submultiple of the frequency of the output of the frequency converter section 168, the output of the flip-flop 172 will be zero Hz. For example, the output of the first frequency converter section 168 might be 16,384 Hz and that of the auxiliary oscillator circuit 152 might be 1,024 Hz. If now the frequency of the oscillator circuit 152 changes to 1,023 Hz, then a signal of frequency 16,384, 16×(1,024−1,023) Hz, i.e. approximately 16 Hz will be produced by the flip-flop 172. The frequency of this output from the flip-flop 172 is designated X in FIG. 6A.

The frequency squaring circuit 174 produces an output signal of frequency proportional to the square of input signal frequency x. The output of the squaring circuit 174 is applied to the second frequency converter section 176 whose output is applied to the frequency summing gate 178 together with the output of the first frequency converter section 168, to produce a signal whose frequency represents the deviated frequency of $a \cdot f_o \cdot (\theta - \theta_o)^2$ term in equation (1) above.

Output $\bar{\phi}$ from the auxiliary oscillator circuit 152 is set in synchronism with the output from the frequency standard 166 (but displaced in phase by 180° with respect to the standard 166 output) by applying the $\bar{\phi}$ signal to the data input terminal of the data type flip-flop 180 and the standard 166 output signal (inverted by the inverter 179) to the clock terminal of the flip-flop 180. The synchronized output from the flip-flop 180 is divided in frequency by a suitable factor in the third frequency converter section 182, and then is added to the output from the frequency summing gate 178 in the frequency summing gate 184.

Thus, the frequency of the output of the summing gate 184 is the sum of three signal frequencies. One of these is a direct subdivision of the output from the crystal controlled frequency standard (i.e. 166 output), another is a frequency which varies linearly with temperature (i.e. the output from the the third frequency converter section 182) and the third is a frequency which varies with the square of the temperature (i.e. the output from the second frequency converter section 176). Note that since in this example exclusive-OR gates are used for frequency summation, the inversion of the clock signal applied to the flip-flop 180 brought about by the inverter 179 is necessary, in order to bring about a correct phase difference relationship with the output from the summing gate 178 for frequency summing to be performed in the frequency summing gate 184.

The output from the summing gate 184 is applied to the fourth or final frequency converter section 186, whose output passes to the time counter circuit 190. The time counter circuit 190 produces time signals which drive the display system 192, and also in the example of FIG. 6A produces a signal REF which is used in the frequency squaring circuit 174. The operation of a circuit example for block 174 will now be described.

Figure 6B:
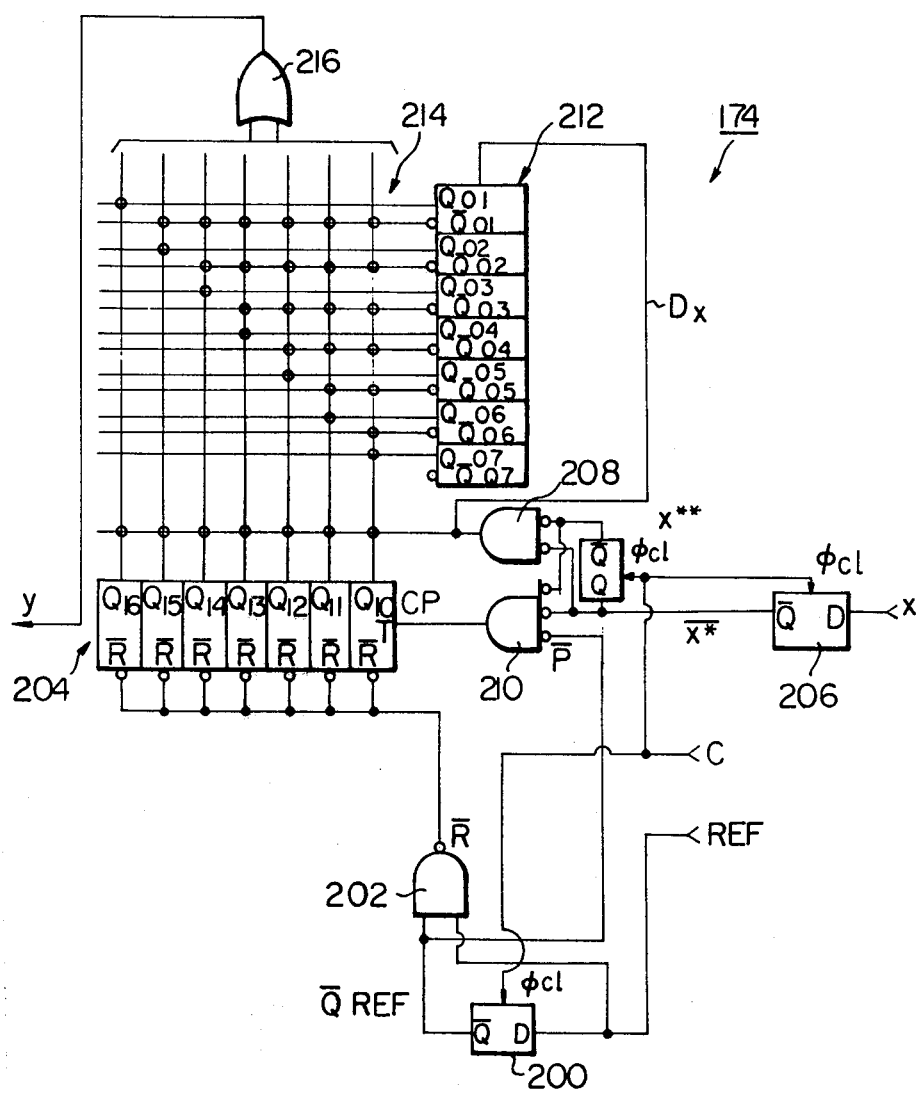
FIG. 6B is a partial circuit diagram of a circuit to generate a signal proportional to the square of an input frequency, for use with the circuit of FIG. 6A.
Figure 6C:
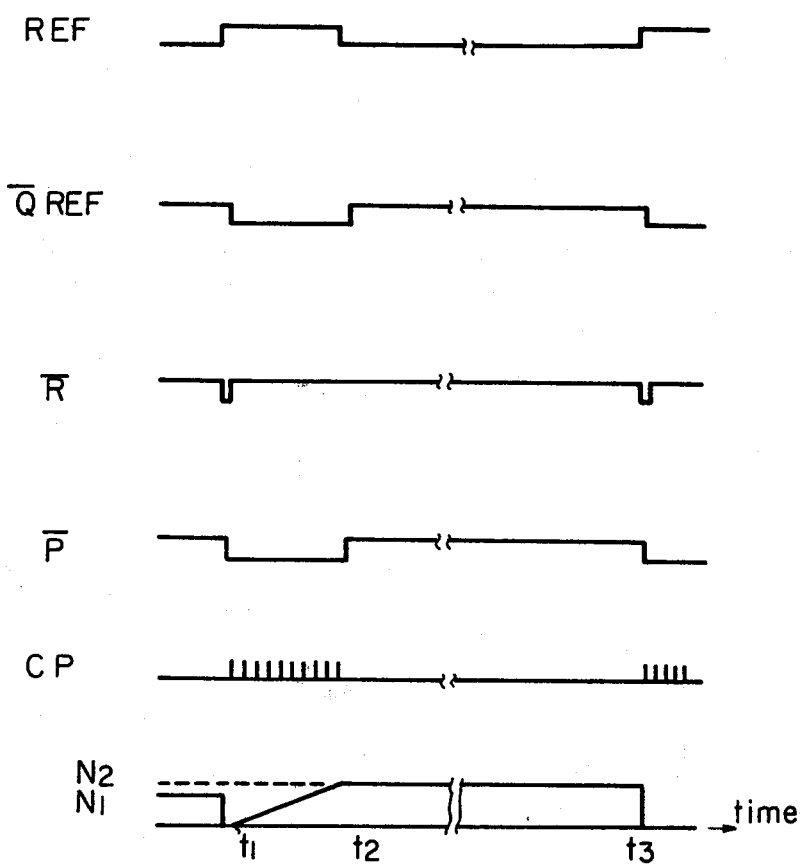

Referring to FIG. 6B and the waveform diagram of FIG. 6C, an input signal x is applied from the flip-flop 172 in FIG. 6A. Input signal REF is a pulse train of low duty cycle as shown in FIG. 6B, which remains at the high and low logic levels for fixed periods of time. Although REF is shown as being generated by the time counter circuit 190 of FIG. 6A, REF may also be produced from any other oscillator or frequency converter circuit capable of providing suitable pulses. REF is inverted and synchronized with the timing of trigger clock pulses $\phi_{c1}$ in a data type flip-flop 200, providing signal $\overline{Q}_{REF}$. By applying the data input and the $\overline{Q}$ output of the flip-flop 200 to a NAND gate 202, shaped output signal $\overline{R}$ is produced, with duration equal to one cycle of clock pulses $\phi_{c1}$. The output $\overline{R}$ serves to reset a chain of flip-flops 204 which are connected to form a first counter, which is a binary counter in this example. Output $\bar{x}^*$ from flip-flop 206 is inverted with respect to input x, while each negative-going and positive-going transition of $x^*$ is synchronized with a negative-going edge of pulses $\phi_{c1}$. Signal $x^{**}$ is of the same frequency as $\bar{x}^*$, but is inverted and delayed by one cycle of $\phi_{c1}$ with respect to $\bar{x}^*$. Thus, since $\bar{x}^*$ and $x^{**}$ are applied to the inhibit inputs of gate 208, a single pulse of duration equal to a cycle of $\phi_{c1}$ is produced following each negative-going edge of signal $x^*$, i.e. a pulse train of identical frequency to input x but consisting of pulses of relatively narrow width. This pulse train is designated $D_x$ in FIG. 6D. Gate 210 produces pulses identical to those output by the gate 208, but these are output only during each period that signal $\overline{Q}_{REF}$ is at the low logic level. These bursts of pulses are designated Cp in FIGS. 6B and 6C.

Thus, following the leading edge of each REF pulse, the binary counter 204 is reset to the zero state, and from $t_1$ to $t_2$ as shown in FIG. 6C a subsequent train of Cp pulses is counted therein, during the low level state of $\overline{Q}_{REF}$. The count of the binary counter 204 will thereby increase linearly during this time, reaching a final count of, say $N_2$ as shown on the lower line of FIG. 6C. This count value is clearly directly proportional to the frequency of the Cp pulses during the REF pulse in which the count to value $N_2$ is performed, i.e. proportional to the frequency of input x during this REF pulse. due to the low duty cycle of signal REF, (for example suitable values are one second for the high level periods of REF and 15 to 300 seconds for the low level periods), the count values stored in the binary counter 204 are affected very little by any noise or jitter on input signal x. The time constant for heat conduction of step changes in temperature, in the case of a timepiece enclosed in a metal casing, is of the order 8 to 15 seconds, while the minimum time for variations in temperature due to the timepiece being worn on the human body is of the order of several minutes. In addition, it requires another 20 to 30 hours for changes in temperature to result in visible variations in the operation of the timepiece. Thus, it would be possible to set the low level period of the REF signal to as long as one hour or more, provided that errors in timekeeping accuracy of 0.5 seconds or slightly less can be neglected.

Clock pulses $D_x$ from the gate 208 are applied to a second binary counter 212 composed of seven flip-flops, with outputs $Q_{01}$, $\overline{Q}_{01}$ to $Q_{07}$, $\overline{Q}_{07}$. The waveforms for these outputs are shown in the upper set of lines in FIG. 6D. With the AND gate matrix 214 shown, then for example if the count in the counter 204 is such that only output $Q_{16}$ of counter 204 is at the high level, then output signal $Q_{01}$ of counter 212 will be selected for input to a frequency summing gate 216. Since output $Q_{16}$ is ANDed together with signal $D_x$ before being ANDed with output $Q_{01}$ in AND gate matrix 214, the signal actually applied to the summing gate 216 in this case will be the pulse train shown in FIG. 6D with the designation $D_x \cdot Q_{01}$. Similarly, if only output $Q_{15}$ of the counter 204 is in the high state, then a signal $\overline{Q}_{01} \cdot Q_{02} \cdot D_x$ will be applied to the summing gate 216.

Thus, depending upon the count state of the counter 204, pulse trains of various frequencies are selected by matrix 214 from the outputs of the counter 212. The signals selected by the matrix is designated as follows:
$C_1 = Q_{01}$
$C_2 = \overline{Q}_{01} \cdot Q_{02}$
$C_3 = \overline{Q}_{01} \cdot \overline{Q}_{02} \cdot Q_{03}$
$C_4 = \overline{Q}_{01} \cdot \overline{Q}_{02} \cdot \overline{Q}_{03} \cdot Q_{04}$
$C_5 = \overline{Q}_{01} \cdot \overline{Q}_{02} \cdot \overline{Q}_{03} \cdot \overline{Q}_{04} \cdot Q_{05}$
$C_6 = \overline{Q}_{01} \cdot \overline{Q}_{02} \cdot \overline{Q}_{03} \cdot \overline{Q}_{04} \cdot \overline{Q}_{05} \cdot Q_{06}$
$C_7 = \overline{Q}_{01} \cdot \overline{Q}_{02} \cdot \overline{Q}_{03} \cdot \overline{Q}_{04} \cdot \overline{Q}_{05} \cdot \overline{Q}_{06} \cdot Q_{07}$ Thus, the general equation for the signal which will be output from the summing gate 216 may be written:
$y = D_x \cdot C_1 \cdot Q_{16}$
$+ D_x \cdot C_2 \cdot Q_{15}$
$+ D_x \cdot C_3 \cdot Q_{14}$
$+ D_x \cdot C_4 \cdot Q_{13}$
$+ D_x \cdot C_5 \cdot Q_{12}$
$+ D_x \cdot C_6 \cdot Q_{11}$
$+ D_x \cdot C_7 \cdot Q_{10}$ where y represents the output from the summing gate 216. As shown in FIG. 6D, the pulse trains represented by the terms of the above equation are interlaced in such a way that frequency summing can be performed merely by utilizing a logic OR gate. Alternatively, an AND gate could be used similarly, if negative-logic pulses were applied. In either case, any combination of pulse trains corresponding to any combination of outputs from the counter 204 may be added correctly in frequency without mutual interference between the pulses. If an exclusive OR gate is used for frequency summing, it is only necessary to ensure that the edges of pulses within the various pulse trains do not coincide.

As explained hereinabove, the count value stored in the counter 204 while frequency summing is taking place, i.e. during time interval $t_2$ to $t_3$ in FIG. 6C, is directly proportional to the frequency of input signal x, which may be designated f(x). Thus, the value stored in the counter 204 may be designated as $k_1 \cdot f(x)$. And obviously the frequency of any summed combination of pulse trains selected in the matrix 214 will be directly proportional to that of the input signal to the counter 212, i.e. to input $D_x$. Therefore, the frequency of any of the pulse trains may be designated as $k_2 \cdot f(x)$. Thus, due to the operation of the matrix 214, the selected combination of pulse trains has a frequency which is the product of two quantities which vary linearly with f(x), and thus is proportional to the square of f(x), i.e. the frequency of the output signal from the summing gate 216 in FIG. 6B may be written $$f(y) = k_3 \cdot f(x)^2$$

where $k_3$ is a constant, which for the circuit shown in FIG. 6B has a value of $2^{-7}$.

The frequencies of the various pulse trains applied to the summing gate 214 may be expressed as follows, with for example, $f(C_1 \cdot D_x)$ having the meaning of the frequency of the pulse train designated $C_1 \cdot D_x$ in FIG. 6D:

$f(C_1 \cdot D_x) = 2^{-1} \cdot f(D_x) = 2^6 \cdot f(C_7 \cdot D_x)$ $f(C_2 \cdot D_x) = 2^{-2} \cdot f(D_x) = 2^5 \cdot f(C_7 \cdot D_x)$ $f(C_3 \cdot D_x) = 2^{-3} \cdot f(D_x) = 2^4 \cdot f(C_7 \cdot D_x)$ $f(C_4 \cdot D_x) = 2^{-4} \cdot f(D_x) = 2^{-3} \cdot f(C_7 \cdot D_x)$ $f(C_5 \cdot D_x) = 2^{-5} \cdot f(D_x) = 2^{-2} \cdot f(C_7 \cdot D_x)$ $f(C_6 \cdot D_x) = 2^{-6} \cdot f(D_x) = 2^{-1} \cdot f(C_7 \cdot D_x)$ $f(C_7 \cdot D_x) = 2^{-7} \cdot f(D_x) = 2^0 \cdot f(C_7 \cdot D_x)$ It should be noted that for the waveform diagram of FIG. 6D, negative edge-triggered logic is assumed, i.e. each transition of a flip-flop output takes place in response to the negative-going edge of a clock pulse applies thereto. Also, although in FIG. 6A the temperature compensation signal frequency components are shown as being derived from the $\overline{\phi}$ output of the auxiliary oscillator 152, it is equally possible to use some other source of signals with suitable frequency and temperature/frequency characteristic.

Figure 7:
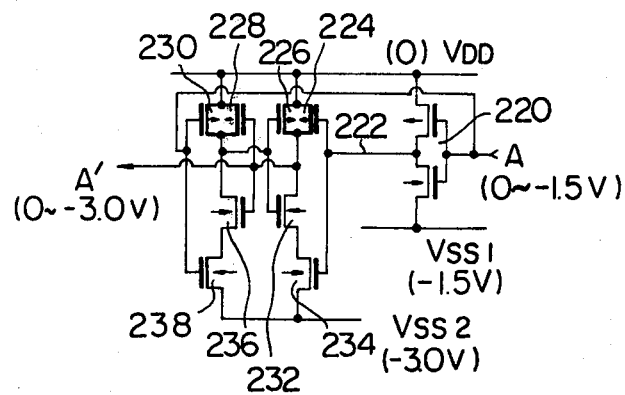
FIG. 7 is a detail circuit diagram of a level shifting circuit whereby signals produced in circuitry operated from a low supply voltage are level shifted for application to circuitry operated from a higher voltage supply.

In FIG. 7, an example of a level shifter circuit for use with the voltage conversion system of the present invention is shown. Input signal A is level shifted to become output signal A'. Inverter stage 220 is operated at a low voltage and input signal A and output 222 of the inverter stage 220 are complementary to each other. NAND gates are formed by the pairs of MOSFETs 224 and 226, 228 and 230, 232 and 234, and 236 and 238. These are connected to form a bistable flip-flop, such that P-channel MOSFET 224 is turned on when signal A is at the low level, with N-channel MOSFET 234 being simultaneously turned off. Since in this condition signal A' is at the high level, P-channel MOSFET 230 is turned off and N-channel MOSFET 238 is turned on. Due to positive feedback action, output signal A' goes rapidly to the $V_{DD}$ level. P-channel MOSFET 226 is turned on and P-channel MOSFET 228 turned off, while N-channel MOSFET 232 turnes off and N-channel MOSFET 236 turns on. The circuit is now in a stable state.

The output signal A' shown is in antiphase to the input signal A. If an output signal in the same phase as input signal A is required, this may be taken from the drain terminals of MOSFETs 228 and 230.

In the design of the level shifter circuit of FIG. 7, it must be ensured that the mutual conductance of the P-channel MOSFETs is made relatively high and that of the N-channel MOSFETs is made relatively low. Thus, the N-channel MOSFETs 234 and 238 will present a higher impedance when a voltage ($V_{SS1}-V_{SS2}$) is applied to their gates than the impedance presented by the P-channel MOSFETs 224 and 230 when a voltage of ($V_{DD}-V_{SS1}$) is applied to their gates. This ensures that the setting of the flip-flop is determined by the MOSFET 224 and MOSFET 230. This condition can be met by making the channel widths of MOSFETs 224 and 230 relatively wide and those of MOSFETs 234 and 238 relatively long, at the time of integrated circuit manufacture.

Figure 8:
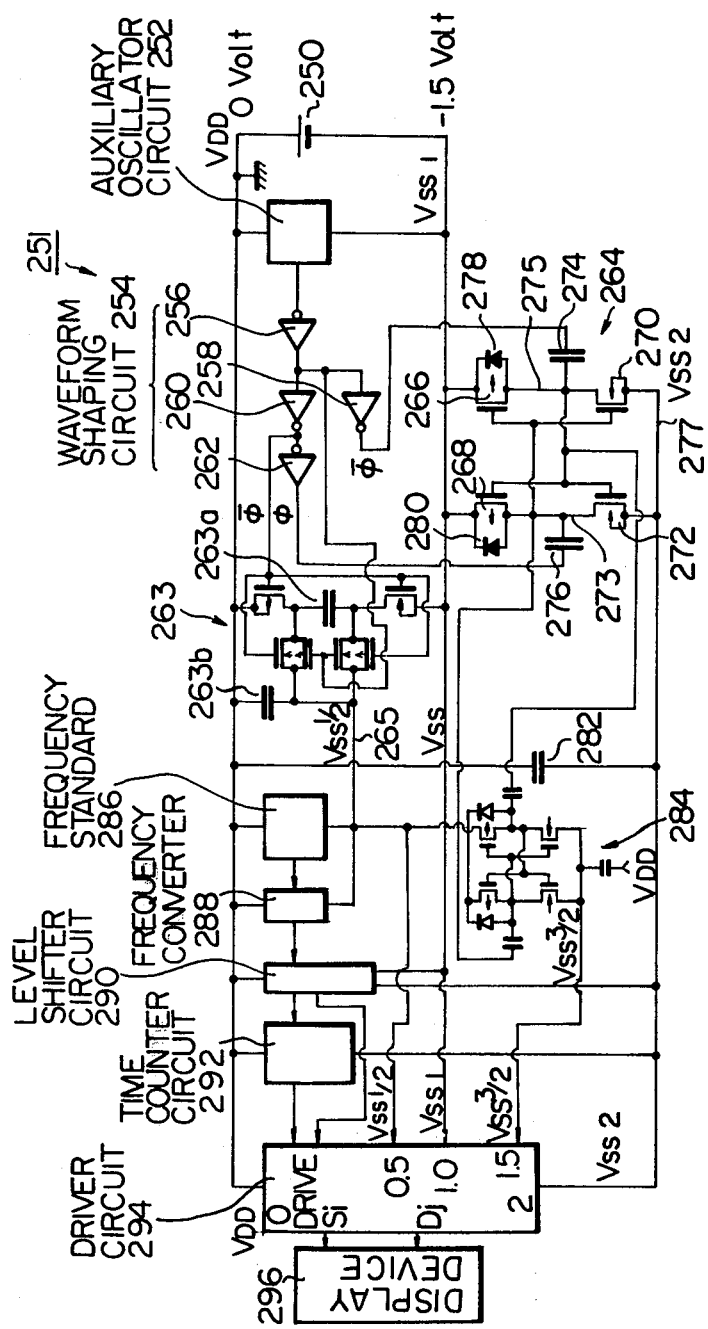
FIG. 8 is a partially detailed circuit diagram of a modification of the present invention whereby voltages of one half, one and one half and twice the battery voltage of the timepiece are produced for application to a display driver unit.

FIG. 8 shows an example of an electronic timepiece circuit incorporating a further preferred embodiment of the voltage conversion system, an electro-optical display drive system embodying the present invention. In this case, both voltage down conversion and voltage up conversion are incorporated. The electronic timepiece comprises a power source 250 and a voltage conversion system 251 composed of an auxiliary oscillator circuit 252 coupled to the power source 250. The oscillator circuit 252 may be of the ring oscillator type previously described. An output signal from the auxiliary oscillator circuit 252 is applied to a waveform shaping circuit 254 which serves as a common driving circuit for driving voltage up converter 264 and voltage down converter 263 and which is composed of inverters 256, 258, 260 and 262. The inverters 262 and 258 perform waveform shaping and also provide first and second phase signals or complementary boost switching signals $\phi$ and $\bar{\phi}$. The switching signal $\bar{\phi}$ is also produced by the inverter 260 and applied to the voltage down converter circuit 263 including capacitors 263a and 263b. The voltage down converter circuit 263 is similar in construction with that described with reference to FIG. 2 and, therefore, a detailed description of the same is herein omitted. The switching signals $\phi$ and $\bar{\phi}$ are also applied to the voltage up converter circuit 264 including switching elements composed of P-channel MOSFETs 266 and 268 and N-channel MOSFETs 270 and 272, capacitors 274 and 276, and diodes 278 and 280. The diode 278 is a clamping diode and capacitor 274 a clamping capacitor in the voltage up converter circuit 264. When the switching signal $\phi$ goes to the high level, the diode 278 becomes forward biased. Simultaneously, the electrode of capacitor 274 connected to the output of the inverter 258 becomes charged positively, and the opposite electrode charged negatively. When the switching signal $\phi$ goes to the low level, the diode 278 is cut off by being reverse biased, and the previously positively charged electrode of the capacitor 274 is set to the low level, i.e. to $V_{SS1}$. The potential of the previously negatively charged electrode of capacitor 274 thereby becomes more negative than $V_{SS1}$ by the amount ($V_{DD}-V_{SS1}$) where $V_{DD}$ is the forward voltage drop across the diode 278. Thus, a combination of the diode 278 and capacitor 274 produces a voltage from the output of the inverter 258 which is clamped to potential $V_{SS1}$ as its high level. The substrate and source of the N-channel MOSFET 270 are connected together and coupled to $V_{DD}$ through capacitor 282. Functionally speaking, MOSFET 270 may be considered to act as ideal diode, the forward direction of the diode being the direction of current flow from drain to source. Thus, the output obtained by clamping signal $\phi$ at potential $V_{SS1}$ as its high level, by means of the diode 278 and capacitor 274, is further rectified by the diode 270 causing charge to be stored in the capacitor 282. If the output impedance of the inverter 258 is such that it is significantly lower than the impedance presented by the MOSFETs 266 and 270 when they turn on, then the high level of the clamped output 275 is almost equal to $2V_{SS1}$. It will not be precisely equal to $2V_{SS1}$, since the forward voltage drop of the diode will cause the clamping level to be somewhat more positive than $V_{SS1}$. If the potential at the output terminal 277 is closs to $2V_{SS1}$, then the MOSFETs 272 and 268 have source voltage levels of $V_{SS1}$ and $2V_{SS1}$, respectively. Thus, when voltage level 253 becomes $2V_{SS1}$, since voltage level 273 is $V_{SS1}$, MOSFET 270 is turned on. Due to the low impedance of MOSFET 270 in the on state, the forward voltage drop of MOSFET 270 existing when it functioned as a diode is eliminated.

With this embodiment of the present invention therefore, the forward voltage in a diode clamping circuit can be effectively eliminated and thus a high efficiency voltage up conversion circuit can be produced. The circuit may be modified such that when the capacitor 276 and diode 280 are used, the capacitor 282 is eliminated. Alternatively, if the diode 282 is utilized, then the capacitor 276 and diode 280 may be omitted. Diode 280 may be replaced by an N-channel MOSFET, whose gate, source and backgate are all connected to lead 273 and the drain is connected to $V_{ss1}$. The same principle may be applied to the other diode 278.

A second voltage up converter circuit 284 operates in the same way as the circuit 264 just described. However, in this case, instead of clamping to the level $V_{SS1}$, clamping is performed to the level $0.5V_{SS1}$, which is output 265 from the voltage down converter circuit 263. Thus a potential of $3/2V_{SS1}$ is obtained, by addition of $V_{SS1}$ to $\frac{1}{2}V_{SS1}$.

As shown, therefore, by combining the circuits shown above, three or more power supplies of potentials such as $\frac{1}{2}$, 3/2 and $2V_{SS1}$ can be produced. In addition, potentials differing from the source voltage $V_{SS1}$ as a reference by amounts such as $\frac{1}{2}V_{SS1}$ or $2V_{SS1}$ can be produced both positive or negative with respect to $V_{SS1}$ potential. A liquid crystal display panel may thus be driven using a dynamic matrix drive system with a $\frac{1}{3}$ voltage application arrangement. With this, the voltages applied to selected and non-selected portions of the matrix are in the ratio of 3:1.

In FIG. 8, the electronic timepiece further comprises a crystal controlled frequency standard 286, which generates an output signal of the order $2^{15}$ to $2^{22}$ Hz. The output signal from standard 286 is applied to a frequency converter 288 in the form of a frequency divider which produces a relatively low frequency signal. This relatively low frequency signal is applied through a lever shifter circuit 290 to a time counter circuit 292, which produces a time or calendar information 35 signals as display information signals. These signals are applied to a driver circuit 294 which drives an electro-optical display device 296 to cause display of time or calendar information.

A way in which the voltage conversion system of the present invention may be applied to a liquid crystal display matrix corresponding to block 296 in FIG. 8, will now be described, in order to illustrate the advantages to be gained therefrom. These advantages are obtained from the fact that it becomes possible to utilize fractional or integral multiples of the timepiece battery voltage in producing drive signals for the liquid crystal display matrix, i.e. the optimum required voltages may be utilized and so efficiency may be maximized.

Figure 9A:
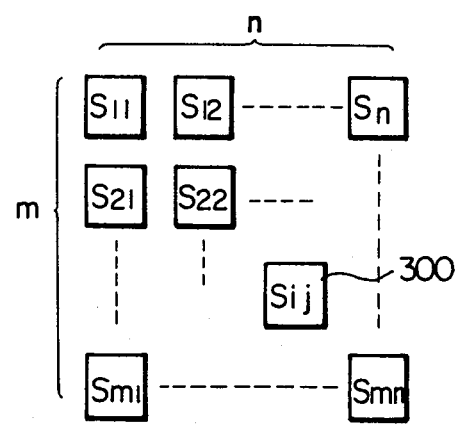
FIG. 9A is a simplified diagram illustrating the arrangement of a liquid crystal display matrix.

Referring now to FIG. 9A, the basic outlines of a matrix for a liquid crystal display unit are shown. $S_{11}$ to $S_{mn}$ represent display elements, driven by n columns and m lines of electrode drive conductors. The n columns of conductors may be formed upon an upper glass substrate while the m rows of conductors may be formed upon a lower glass substrate, these substrates being separated by suitable insulating spacers within which a layer of field-effect liquid crystal material is sandwiched. To address a typical element, $S_{ij(300)}$, the applied rout mean square (r.m.s.) voltages by the i-th row and the j-th column which are common to display element 300 must be larger than the threshold voltage of the liquid crystal. The liquid crystal element should have the characteristic of rapid response, such that the element may be turned on by a drive pulse of short duration, and also should have a long decay time, such that the "ON" condition is memorized during each cycle of drive pulses and also the ratio of the threshold voltage to the saturation voltage is larger than 0.5 to 1.

Figure 9C:
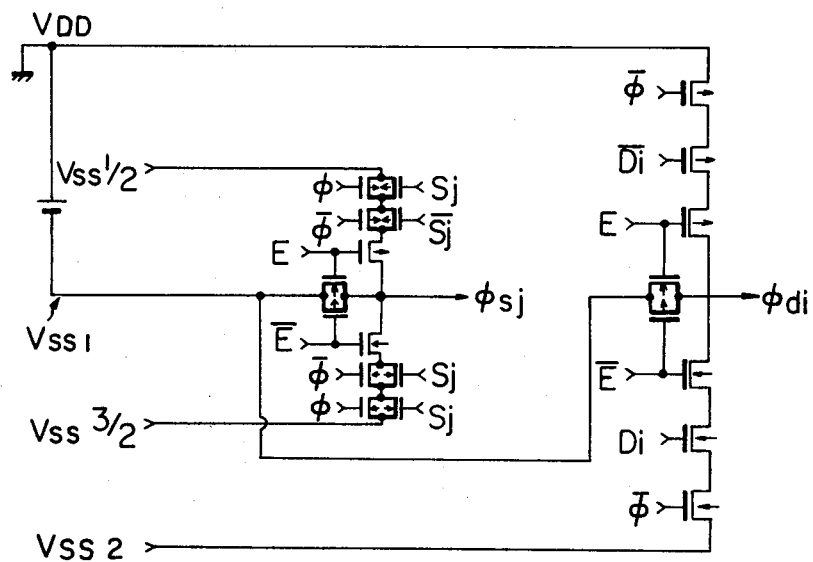
FIG. 9C is a waveform diagram for the circuit of FIG. 9B.
Figure 9B:
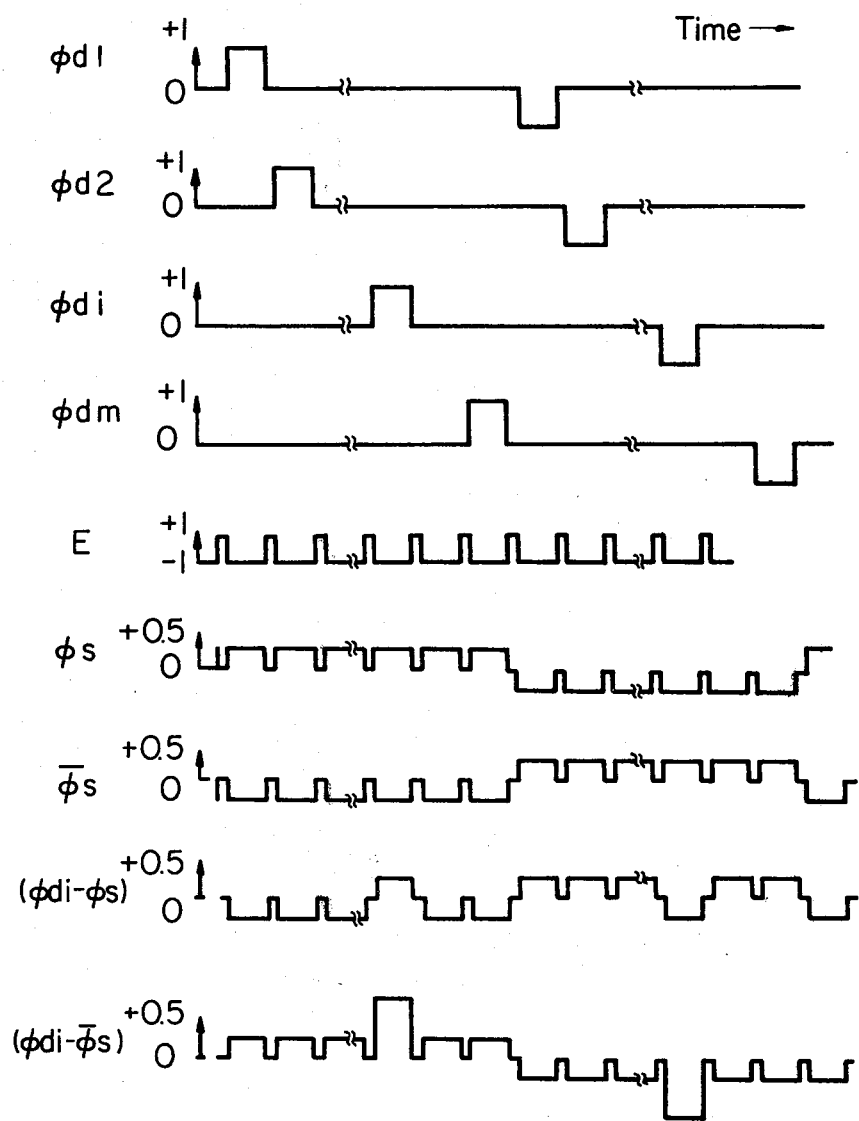
FIG. 9B is a detail circuit diagram of a portion of a display drive circuit for a liquid crystal display.

Referring to the waveform diagram of FIG. 9B, each line of the matrix of FIG. 9A is selected by one of the signals $\phi_{di}$ to $\phi_{dm}$, i.e. corresponding to the upper electrodes of the matrix, for example. Selection of columns, i.e. the lower electrodes, is performed by application of either signal $\phi_s$ or signal $\bar{\phi}_s$, depending upon whether the ON or OFF state is required for the element selected.

An example of a circuit for display driving which is suitable for use with the voltage conversion system of the present invention is shown in FIG. 9C. Signal $\phi_{sj}$ represents either $\phi_s$ or $\bar{\phi}_s$ (in FIG. 9B) depending upon the polarity of signal $S_j$ and $S_j$. Signal $\phi_{sj}$ thus determines whether the selected element is to be turned to the ON state or the OFF state. For example, to turn element $S_{ij}$ in FIG. 9A to the ON state, then $\phi_{sj}$ is selected to be low level as $\bar{\phi}_s$ during the time in which signal $\phi_{di}$ is at the high level of $\phi$. When signal $\phi_{di}$ is at the low level as $\phi$, then signal $\phi_{sj}$ becomes as high level as $\bar{\phi}_s$. Again, for example, if segment $S_{ig+1}$ is required to be turned to the OFF state, then signal $\phi_{sj+1}$ is selected to become $\phi_s$ while $\phi_{di}$ is at the level of $\phi$.

Due to the capacity of the liquid crystal elements, a discharge current flows from the segments being driven each time the polarity of the alternating voltage of the drive pulses changes. In conventional designs of liquid crystal drive systems, this current flows through the battery of the timepiece in such a way as to cause increased power consumption. To save such power consumption, the signals $\phi^*$ and $\bar{\phi}^*$, which are slightly different only in phase, are replaced with $\phi$ and $\bar{\phi}$ signals which are applied to the gate of the circuit to produce output $\phi_{di}$. In other case, for modulating the display mode, signals E and $\bar{E}$ are applied as shown in FIG. 9B and 9C, such that a short circuit path is provided to reduce the OFF state r.m.s. voltage applied to the segment to a value lower than the threshold voltage of the liquid crystal cell.

Referring to FIG. 9B, since the voltage applied to a segment required to be in the OFF state can be expressed by $(\phi_{di}-\phi_s)$ whereas the voltage to be applied to a segment which is to be turned to the ON state is expressed by $(\phi_{di}-\bar{\phi}_s)$, it can be seen that a voltage three times that in the OFF state is applied to turn the segment to the ON state, although this high voltage is applied only for a short period. For signal $\phi_{sj}$ in FIG. 9C, the respective potential levels are $V_{ss\frac{1}{2}}$ for the high level $V_{ss1}$ for the intermediate level, and $V_{ss3/2}$ for the low level. While E is at the high level, $\phi_{sj}$ is at the intermediate level, and when E is at the low level, $\phi_{sj}$ varies between $V_{ss\frac{1}{2}}$ and $V_{ss3/2}$. When $S_j$ is at the high level, $\phi_{sj}$ becomes in the same phase as $\phi$, when $\phi_{sj}$ is at the low level, $\phi_{sj}$ becomes in the same phase as $\bar{\phi}$. Signal $\phi_{di}$ varies between a high level of $V_{DD}$ and a low level of $V_{ss2}$, with an intermediate level of $V_{ss1}$. $\phi_{di}$ goes to the intermediate level when either E or $\bar{D}_1$ is at the high level, and is in the same phase as $\phi$ when $\bar{D}_i$ is at the low level. The high and low logic levels of $\phi$, $\bar{\phi}$, E, $\bar{E}$, $D_i$ and $\bar{D}_i$ in FIG. 9C may be considered to be $V_{DD}$ and $V_{ss2}$, respectively. In the case when E is at low level, the relationship between liquid crystal threshold voltage and signals shown in FIG. 9C may be expressed:

$$(((m-1)(V_{ss\frac{1}{2}}-V_{ss1})^2 + (V_{DD}-V_{ss\frac{1}{2}})^2) \div m)^{\frac{1}{2}} < V_{TLC}$$

$$((((m-1)(V_{ss\frac{1}{2}}-V_{ss1})^2 + (V_{DD}+V_{ss\frac{1}{2}})^2) \div m^{\frac{1}{2}} > V_{TLC}$$

Thus, depending upon $V_{TLC}$, various voltages such as $\frac{1}{3}, \frac{2}{3}, 3/3$ and 4/3 of the source voltage may be provided for use in such a display drive application, using a voltage conversion system of the present invention (the 3/3 ratio would simply be the source voltage directly applied).

With presently available liquid crystal materials, matrix configurated elements may be driven by a voltage $V_{LC}$ of 1.1 V. These can be driven in a matrix composed of from 8 columns by 2 lines to 8 columns by 8 lines, for example. In such a system, it is rational to perform information processing at low voltage, and to provide display drive signals such as $\phi$ by level shifting to a higher voltage.

Figure 10A:
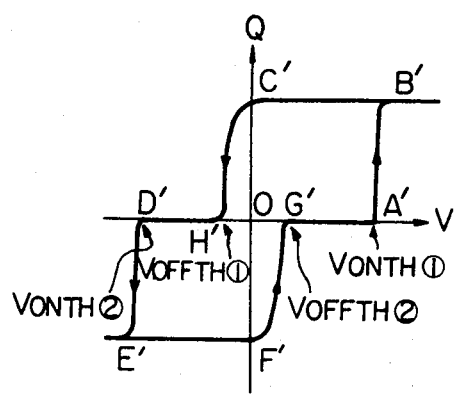
FIGS. 10A and 10B are graphs illustrating the effects of voltages applied to electrochromic display elements.
Figure 10B:
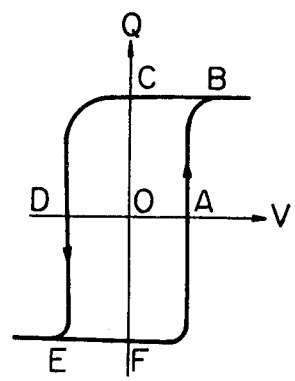

FIGS. 10A and 10B show the relationship between the voltages applied to PLZT or electrochromic display elements and the resultant state of the element. The drive system for an element with the characteristic shown in FIG. 10A will depend upon whether the element is switched on at point B' and off at point O (Q=0) or whether the element is switched on at point B' and off at point E'. In the case of a PLZT element, where Q represents the degree of polarization of the element, the ON state will occur at point B' and the OFF state between points H' and D'. Thus, the element may be switched on by applying a voltage greater than the range O to A', and may be turned off by applying a reverse voltage of between H' to D'. In the case of an electrochromic display element, a similar driving method may be used. In this case, Q denotes the amount of electrochemically separated material (positive for separation on the front face of the element and negative for separation on the rear face).

Where a PLZT, electrochromic or elastomeric display element having the characteristic shown in FIG. 10B is used, it is necessary to limit the amount of electrical charge accumulated in the element to that corresponding to position D when turning off the element (or position A, depending upon the element configuration). The OFF voltage applied may also be set to point O, thereby forming a minor loop. If a clearly visible distinction can be made between the states of the element at points B and E, then the element is turned on by application of a voltage bringing the element to state B, and is turned off by a voltage sufficient to bring it to state E.

Figure 10C:
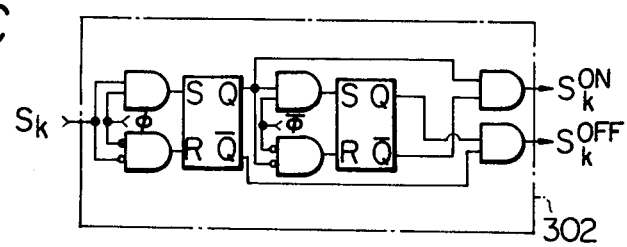
FIG. 10C is a circuit diagram of an example of a driver circuit for electrochromic display elements.

FIG. 10C shows an example of a driver circuit 302 for a PLZT or electro-chromic display element with the characteristic shown in FIG. 10A. Following the rising edge of display signal $S_k$, a signal $S_k$ on is generated in synchronism with signal $\phi$, as a single pulse. Following the trailing edge of $S_k$, a signal $S_k$ off is generated in synchronism with $\phi$, also as a single pulse. Signal $S_k$on serves to turn the selected display element to the visible state, while $S_k$off turns the selected element to the OFF or non-visible state.

Figure 10D:
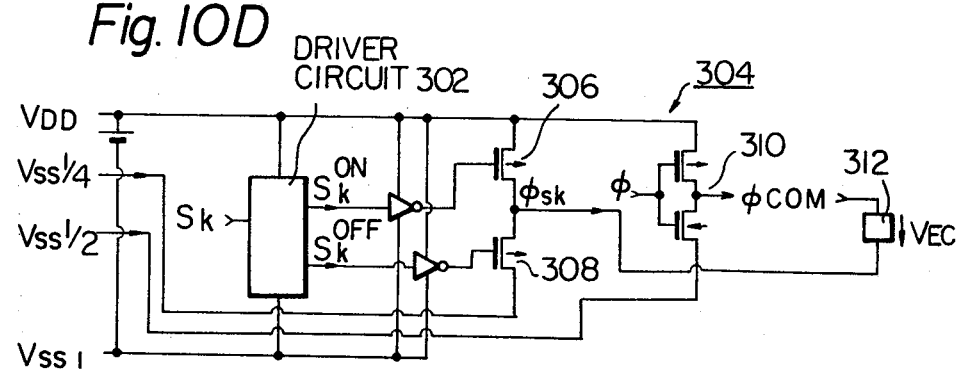
FIG. 10D is a circuit diagram of an example of a driver circuit for electrochromic display elements utilizing the voltage level conversion system of the present invention.
Figure 10E:
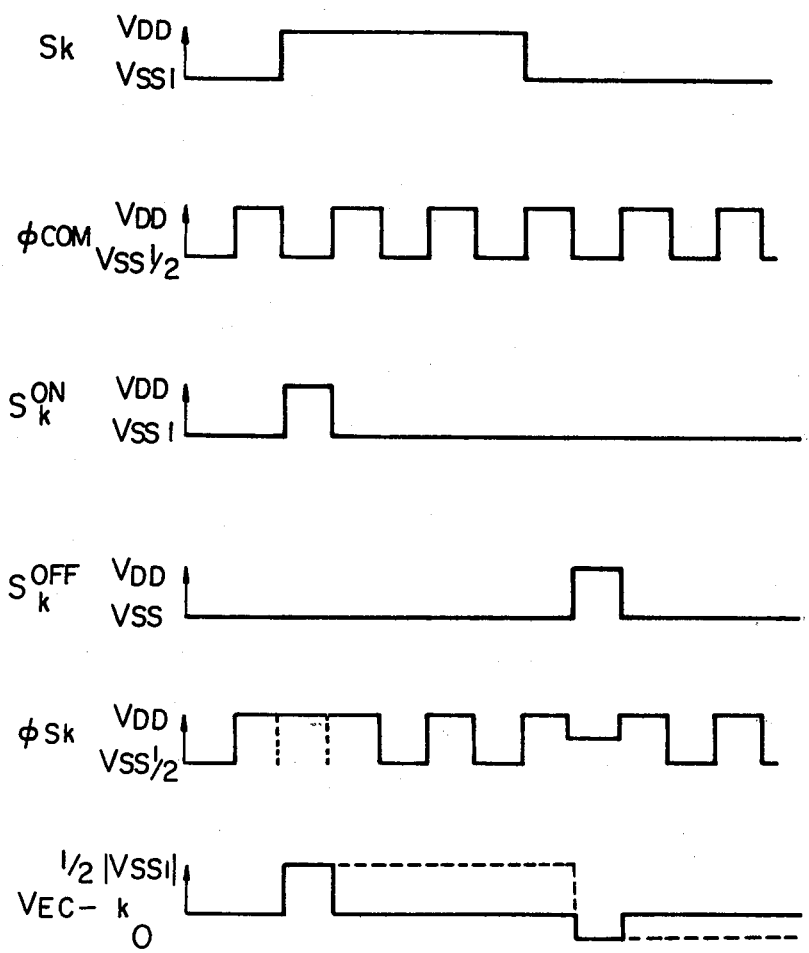
FIG. 10E is a waveform diagram for the circuit of FIG. 9D.

FIG. 10D shows an example of a driver circuit 304 incorporating the circuit 302 of FIG. 10C which is suitable for application of the voltage conversion system of the present invention. P-channel MOSFET 306 is turned on when signal $S_k$on goes to the high level, and so output signal $\phi_{sk}$ goes to level $V_{DD}$. When signal $S_k$off goes to the high level, then P-channel MOSFET 308 is turned on and signal $\phi_{sk}$ goes to the level $V_{SS1}$. Note that signals $S_k$on and $S_k$off cannot both go to the high level simultaneously. With both $S_k$on and $S_k$off at the low level, MOSFETs 306 and 308 are completely cut off. Thus, the voltage applied to display element 312 falls to zero with a time constant determined by the leakage resistance and capacitance of the display element, or remains at the level which has been established. Output $\phi_{com}$, in synchronism with $\overline{\phi}$ but of different voltage level, is produced from inverter 310. This signal is applied to display element 312 to provide a common electrode voltage. As a result, the total potential applied to the selected element 312, designated $V_{ec-k}$, has the waveform shown in FIG. 10E. The waveforms for $\phi_{sk}$, $\phi_{com}$, $S_k$, $S_k$on and $S_k$off are also shown in FIG. 10E.

A method whereby the voltage conversion system of the present invention may be used to increase the efficiency of an electronic timepiece with a pulse motor will now be described with reference to FIG. 11A, and the corresponding waveform diagrams in FIG. 11B. A part of timepiece circuit section 322 in in FIG. 11A incorporates a crystal controlled frequency standard, frequency divider and waveform shaping circuits, operated from the low voltage $V_{SS\frac{1}{2}}$. Level shifter circuit 324 is capable of producing output signals of lower potential than the negative level of the battery voltage, $V_{SS1}$, by utilizing supply $V_{SS2}$ produced by a voltage converter circuit. The voltage $V_{ss2}$ has a magnitude twice that of $V_{ss1}$, and $V_{ss\frac{1}{2}}$ is one quarter the value of $V_{ss1}$. A pulse motor M is driven by FET inverters 325 and 327, which have large current carrying capacity. When a low potential signal of amplitude twice $V_{ss1}$ is applied to the gates of P-channel MOSFETs 326 and 330, these FETs are turned to the ON state. The circuit shown has the advantage that the impedance of MOSFETs 326 and 330 in the ON state is ¼ that of MOSFETs used in a conventional circuit in which voltage supply $V_{ss2}$ is not provided. This is because a low potential signal of amplitude $2V_{ss1}$ is applied to the gates of MOSFETs 326 and 330 to turn them ON. The area on the timepiece integrated circuit chip required to accomodate the motor drive inverters can therefore be reduced.

Figure 11A:
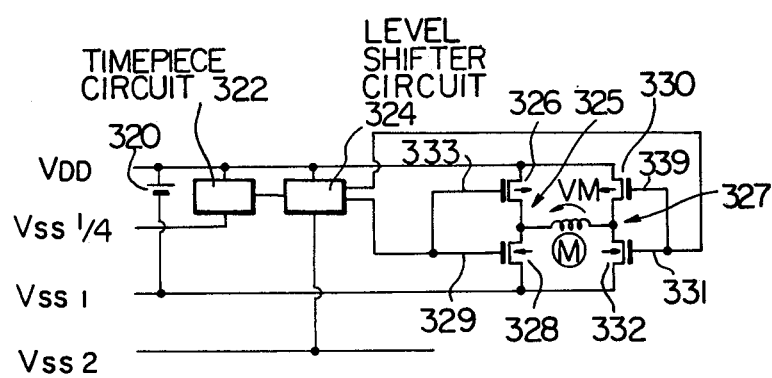
FIG. 11A is a circuit diagram illustrating a method of applying the voltage conversion system of the present invention to a timepiece of an electro-mechanical transducer type.
Figure 11B:
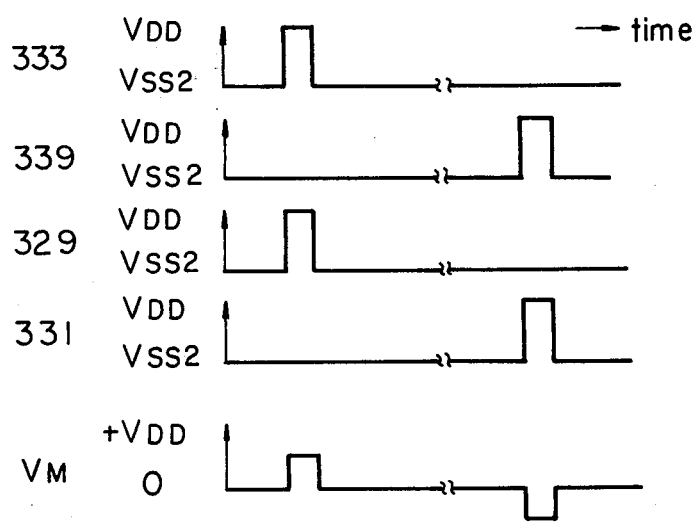
FIG. 11B is a waveform diagram for the circuit of FIG. 11A.

With the circuit as shown in FIG. 11A, such a reduction in impedance (compared to a conventional circuit) does not occur when N-channel MOSFETs 328 and 332 are turned ON. However, since the gate signals 329 and 331 have a potential more negative than $V_{ss1}$, in the low level state of these signals, MOSFETs 328 and 332 are completely cut off. Thus, the leakage current flowing in MOSFETs 328 and 332 in the OFF state is extremely low.

If it is desired to further decrease the impedance of MOSFETs 328 and 332 in the ON state, this may be achieved by inserting capacitors between their gates and inputs 329 and 333, and 331 and 339, respectively, to provide DC blocking. The gates may then be connected by diodes to $V_{ss1}$, to be clamped to this potential. Input 334 should still be connected directly to the gate of MOSFET 326, while input 339 is still applied directly to the gate of MOSFET 330. Alternatively, an additional supply voltage of $2V_{DD}$, i.e. positive with respect to $V_{DD}$ may be provided. In this case, inverters 325 and 327 may be driven by signals whose logic level range is from $V_{ss2}$ to $V_{DD2}$.

It will now be appreciated from the foregoing description that in accordance with the present invention an electronic timepiece of extremely low power consumption can be provided to increase lifetime of a power source of the timepiece. It should also be understood that in accordance with the present invention the combination of "voltage-down conversion" and the "level conversion" of the signals in an electronic timepiece can be achieved at a high level of efficiency.

While the present invention has been shown and described with reference to particular embodiments by way of example, it should be noted that various other changes or modifications may be made without departing from the scope of the present invention.

What is claimed is:

1. An electro-optical display drive system, comprising, in combination:
    an electro-optical display unit;
    means for generating display information signals;
    a voltage conversion system coupled to a power source to provide a lower output voltage than that of the power source and composed of a voltage down converter including a plurality of electric energy storage means, and means for switching connections of said plurality of electric energy storage means relative to the power source for thereby providing said lower output voltage; and
    a driver circuit responsive to said display information signals for generating drive signals having potentials depending on at least said output voltage of the power source and said lower output voltage of said voltage conversion system to drive said electro-optical display unit so as to cause the same to display of information.

2. An electro-optical display drive system according to claim 1, in which said electro-optical display unit comprises a liquid crystal display unit.

3. An electro-optical display drive system according to claim 2, in which said liquid crystal display unit comprises a plurality of display elements arrayed in a matrix configuration and said driver circuit comprises a matrix drive circuit.

4. An electro-optical display drive system according to claim 1, in which said electro-optical display unit comprises an electrochromic display unit.

5. An electro-optical display drive system according to claim 1, in which said electro-optical display unit comprises a PLZT display unit.

6. An electro-optical display drive system according to claim 1, in which said voltage conversion system also includes a voltage up converter coupled to the power source to provide a higher output voltages than that of the power source, said driver circuit being responsive to said higher output voltages to produce said drive signals having said potentials also depending on said higher output voltages.

7. An electro-optical display drive system according to claim 6, in which said voltage conversion system also includes a signal generator coupled to the power source to generate a first phase signal to cause said switching means to set said plurality of electric energy storage means into a parallel connected condition, and a second phase signal to cause said switching means to set said plurality of electric energy storage means into a series connected condition.

8. An electro-optical display drive system according to claim 1, in which said switching means comprises insulated gate field effect transistors.

9. An electro-optical display drive system according to claim 1, in which each of said electric energy storage means comprises a capacitor.

10. An electro-optical display drive system according to claim 7, in which said voltage up converter comprises a plurality of capacitors, and a plurality of switching elements for switching connections of said plurality of capacitors for producing said higher output voltages.

11. An electro-optical display drive system according to claim 10, in which said signal generator comprises a common driving circuit adapted to operate said voltage down converter and said voltage up converter.

12. An electro-optical display drive system according to claim 10, in which said first phase signal and said second phase signals are commonly used in said voltage up converter to perform a voltage up conversion.

13. An electro-optical display drive system according to claim 12, in which said common driving circuit comprises first and second inverters for generating said first phase signal and said second phase signal, respectively, and each of said switching elements comprises an insulated gate field effect transistor having a gate electrode to which an output of one of said inverters is coupled to apply one of said first and second phase signals, and source and drain electrodes to which said output of said one of said inverters is connected to apply said output voltage of the power source.

14. An electro-optical display drive system according to claim 7, in which said signal generator comprises a ring oscillator, and temperature sensing means coupled to said oscillator for causing said oscillator to serves as a temperature sensitive oscillator to generate an output signal at a frequency varying in dependance on ambient temperature.

15. An electro-optical display drive system according to claim 1, in which said power source comprises a lithium battery.

16. An electro-optical display drive system according to claim 1, in which said power source comprises a silver oxide battery.

* * * * *